United States Patent [19]

Ukai

[11] Patent Number: 4,810,060
[45] Date of Patent: Mar. 7, 1989

[54] ACTIVE COLOR LIQUID CRYSTAL DISPLAY ELEMENT COMPENSATING FOR DIFFERING VOLTAGE-TRANSMISSION CURVES OF THE PRIMARY COLORS

[75] Inventor: Yasuhiro Ukai, Kobe, Japan
[73] Assignee: Hosiden Electronics Co. Ltd., Osaka, Japan
[21] Appl. No.: 143,863
[22] Filed: Jan. 14, 1988
[30] Foreign Application Priority Data
Jan. 22, 1987 [JP] Japan .................................. 62-13171
[51] Int. Cl.⁴ .............................................. G02F 1/13
[52] U.S. Cl. ................................ 350/333; 350/336; 350/339 R; 350/334
[58] Field of Search ............... 350/333, 339 R, 339 F, 350/334, 336

[56] References Cited

U.S. PATENT DOCUMENTS

| | | | |
|---|---|---|---|
| 4,600,274 | 7/1986 | Morozumi | 350/339 F |
| 4,601,546 | 7/1986 | Ohta | 350/339 F |
| 4,716,403 | 12/1987 | Morozumi | 350/339 F X |
| 4,728,172 | 3/1988 | Cannella | 350/333 X |
| 4,728,175 | 3/1988 | Baron | 350/333 X |
| 4,761,058 | 8/1988 | Okubo et al. | 350/333 X |

FOREIGN PATENT DOCUMENTS

| | | | |
|---|---|---|---|
| 60-159828 | 8/1985 | Japan | 350/339 F |
| 60-159827 | 8/1985 | Japan | 350/339 F |
| 60-159830 | 8/1985 | Japan | 350/339 F |
| 60-207118 | 10/1985 | Japan | 350/333 |

*Primary Examiner*—Stanley D. Miller
*Assistant Examiner*—Richard Gallivan
*Attorney, Agent, or Firm*—Pollock, Vande Sande and Priddy

[57] ABSTRACT

In an active color liquid crystal display element in which display electrodes are arranged in a matrix form within a liquid crystal cell, color filters of three primary colors are each disposed opposite one of the display electrodes, the color filters of the three colors being distributed substantially uniformly, and a thin film transistor connected to each display electrode is controlled, by switching, in accordance with an input color image signal to charge and discharge the display electrode for displaying a color image, the structures of the thin film transistors are selected corresponding to the color filters of the three primary colors so that substantially the same light transmission-voltage characteristic is provided for all the three color filter portions.

10 Claims, 3 Drawing Sheets

ACTIVE COLOR LIQUID CRYSTAL DISPLAY ELEMENT COMPENSATING FOR DIFFERING VOLTAGE-TRANSMISSION CURVES OF THE PRIMARY COLORS

BACKGROUND OF THE INVENTION

The present invention relates to an active color liquid crystal display element which includes in a liquid crystal cell pixel or display electrodes, thin film transistors for charging and discharging them, and color filters of three colors disposed opposite the display electrodes, respectively, and distributed substantially uniformly throughout the liquid crystal cell.

A conventional liquid crystal display element of this kind has such a structure as shown in FIG. 1, in which liquid crystal 14 is sealed in a space defined by a pair of opposed transparent substrates 11 and 12 as of glass which are separated by a spacer 13 interposed between their marginal edges. On the inside surface of the one transparent substrate 11 a plurality of display electrodes 15 are arranged in a matrix form and a plurality of thin film transistors 16 are each disposed in contact with one of them, as a switching element therefor. Each thin film transistor 16 has its drain connected to the display electrode 15 corresponding thereto. The other transparent substrate 12 is covered substantially all over the entire area of its inner surface with a common transparent electrode 17 in opposing relation to the plurality of display electrodes 15.

As shown in FIG. 2, the display electrodes 15 substantially square in shape are disposed close in rows and columns on the transparent substrate 11, a gate bus 18 is formed along each row of the display electrodes 15 in adjacent but spaced relation thereto, and a source bus 19 is similarly formed along each column of the display electrodes 15 in adjacent but spaced relation thereto. At each intersection of the gate and source buses 18 and 19 the thin film transistor 16 is disposed with its gate connected to the gate bus 18, its source connected to the source bus 19 and its drain connected to the corresponding display electrode 15.

Voltage is applied across a selected one of each of the gate and source buses 18 and 19, by which is conducted only one of the thin film transistor 16 that is supplied with the voltage, and charges are stored in the display electrode 15 connected to the drain of the conducted thin film transistor 16. Thus, voltage is applied across the liquid crystal 14 only between the charged display electrode 15 and the common electrode 17, by which only that portion of the liquid crystal 14 is made transparent or untransparent to light, thus providing a selective display. The display can be erased simply by discharging the stored charges from the display electrode 15.

Conventionally, the thin film transistor 16 has such a structure as depicted in FIGS. 3 and 4. That is, the display electrode 15 and the source bus 19 are each formed by a transparent conductive film as of ITO on the transparent substrate 11, a semiconductor layer 21 of amorphous silicon or similar material is formed between and over opposed marginal edges of the display electrode 15 and the source bus 19 lengthwise thereof, and a gate insulating film 22 of silicon nitride or the like is formed over the semiconductor layer 21. On the gate insulating film 22 a gate electrode 23 is formed in an overlapping relation to the semiconductor layer 21 between the display electrode 15 and the source bus 19.

The gate electrode 23 is connected at one end to the gate bus 18. The display electrode 15 and the source bus 19 thus lying opposite the gate electrode 23 constitute drain and source electrodes 15a and 19a, respectively. The electrodes 15a and 19a, the semiconductor layer 21, the gate insulating film 22, and the gate electrode 23 make up the thin film transistor 16. The gate electrode 23 and the gate bus 18 are simultaneously formed of aluminum, for instance.

On the transparent substrate 12 red, green and blue color filters 1R, 1G and 1B are each formed opposite one of the display electrodes 15. These color filters are substantially uniformly distributed so that they are fairly intermingled with one another, as shown in FIG. 3. In this way, an active color liquid crystal display element is constituted.

Incidentally, a color liquid crystal display element which utilizes such color filters and TN liquid crystal, for example, shows different light transmission characteristics for red (R), green (G) and blue (B) color signal voltages, as depicted in FIG. 5. This does not yield a color display of good quality. A solution to this problem, proposed so far, is a multigap structure in which the thickness of the liquid crystal thickwise of the liquid crystal cell is changed for each color filter, thereby compensating for each color signal voltage-transmission characteristic, as disclosed in Japanese Patent Application Laid Open No. 159823/85.

The color liquid crystal display element of this multigap structure encounters difficulty in controlling the thicknesses of the color filters and suffers liability to variations in orientation owing to irregularities of the color filters. Furthermore, the varying thicknesses of the liquid crystal yield different response times for red, green and blue color signals.

SUMMARY OF THE INVENTION

It is therefore an object of the present invention to provide an active liquid crystal display element which is free from the above-mentioned defects of the prior art.

In the active color liquid crystal display element of the present invention the thin film transistor has a structure specific to each color to provide substantially the same light transmission-voltage characteristic for the three colors.

DESCRIPTION OF THE PREFERRED EMBODIMENTS

A description will be given of various means for specifying the structure of the thin film transistor for each color.

A drain current $I_D$ of the thin film transistor, in a saturated region, is given by the following expression:

$$I_D = \frac{W\mu C_g}{2L}(V_G - V_T)^2 \quad (1)$$

where W is the channel width, L the channel length between source and drain, $\mu$ the field effect mobility, $C_g$ the gate capacitance, $C_g = \epsilon_0 \epsilon_r S/d$, where $\epsilon_0$ is the dielectric constant of air, $\epsilon_r$ the dielectric constant of the gate insulating film, S the area of the gate electrode, d the thickness of the gate insulating film, $V_G$ gate voltage, and $V_T$ a threshold voltage.

Figure 1:
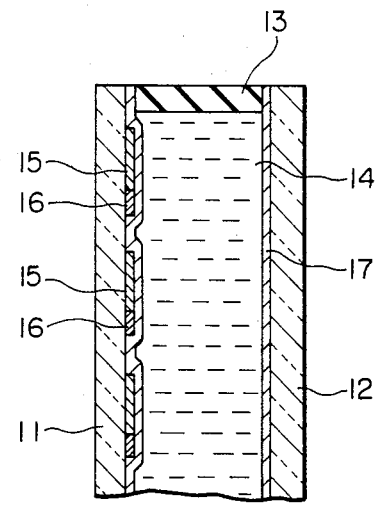
FIG. 1 is a sectional view showing a part of a conventional liquid crystal display element.
Figure 2:
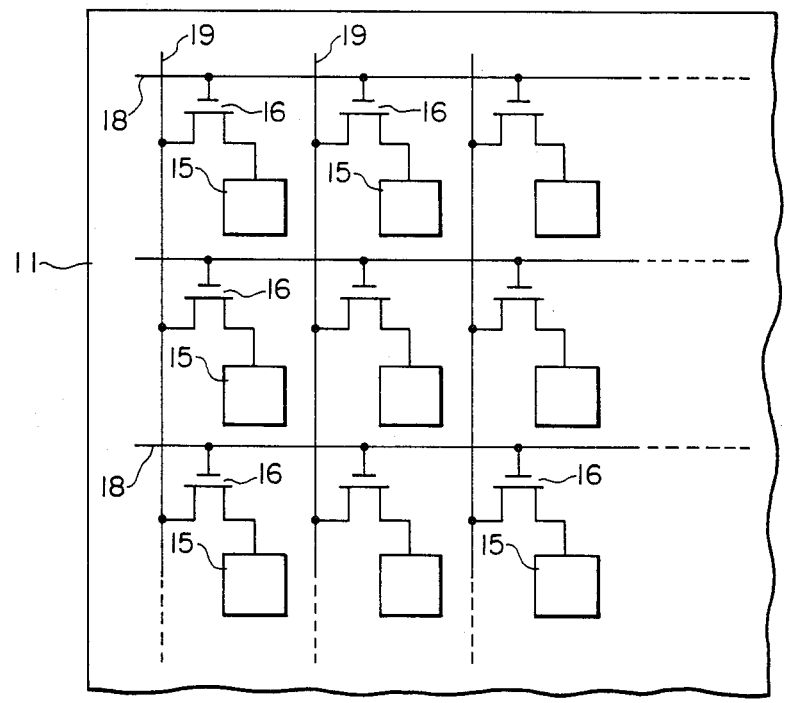
FIG. 2 is a circuit diagram showing the relationship between its display electrode 15, thin film transistor 16 and buses 18 and 19.
Figure 3:
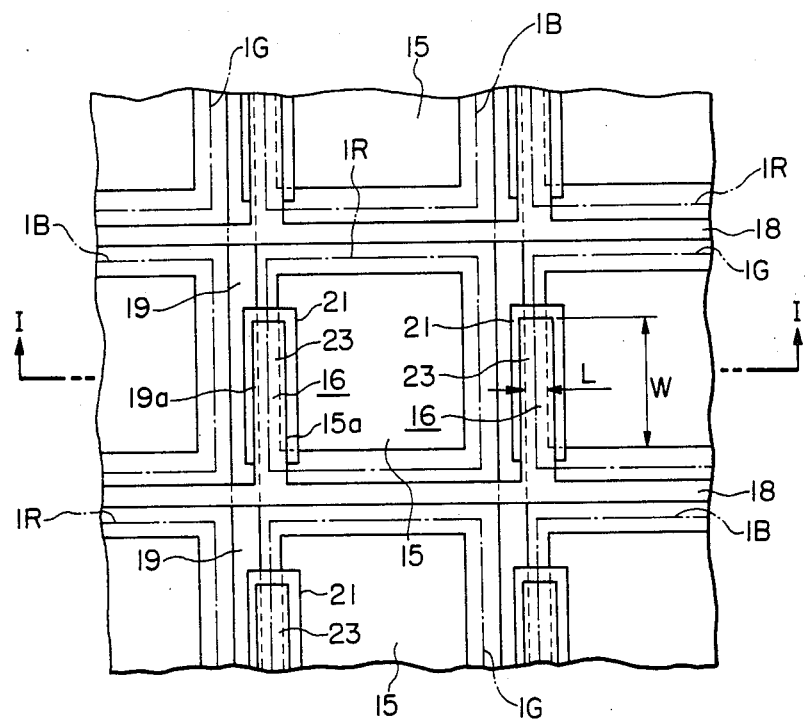
FIG. 3 is a plan view illustrating the relationship between the substrate 11 and the color filters in the liquid crystal element shown in FIG. 1.
Figure 4:
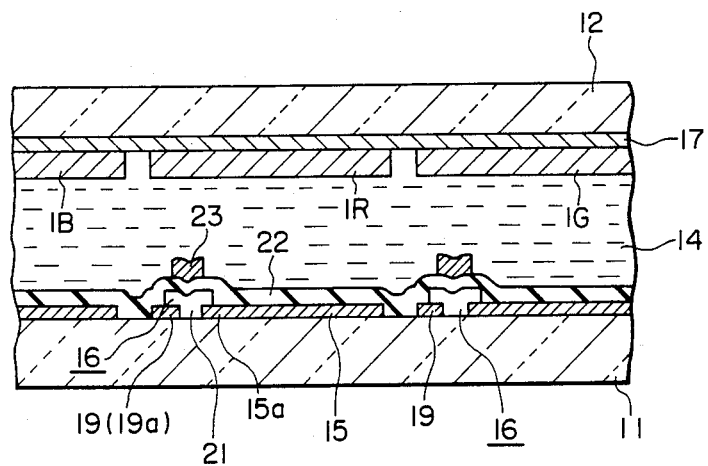
FIG. 4 is a sectional view taken on the line I—I in FIG. 3.
Figure 5:
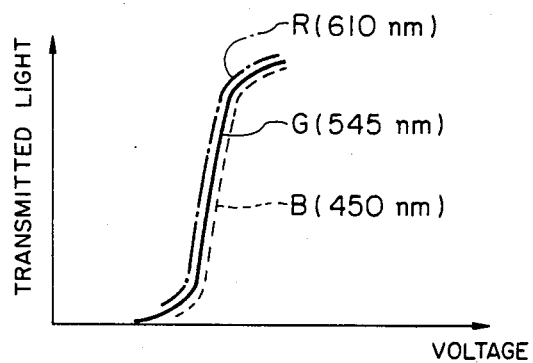
FIG. 5 is a graph showing the light transmission-voltage characteristics of the color filters.

(a) According to expression (1), the drain current $I_D$ is proportional to a ratio W/L (see FIG. 3). Since the drain voltage $V_D$ is proportional to the drain current $I_D$, the ratios W/L of the thin film transistors are determined in accordance with the characteristics of the color filters disposed opposite them (depicted in FIG. 5); namely, the ratio W/L of the thin film transistor connected to the display electrode lying opposite the green color filter (which transistor will hereinafter be referred to as the thin film transistor of the green color filter) is selected higher than the ratio W/L of the thin film transistor connected to the display electrode lying opposite the red color filter (which transistor will hereinafter be referred to as the thin film transistor of the red color) but lower than the ratio W/L of the thin film transistor connected to the display electrode lying opposite the blue color filter (which transistor will hereinafter referred to as the thin film transistor of the blue color filter). Accordingly, the voltage applied to the green filter portion is higher than the voltage applied to the red color filter portion but lower than the voltage applied to the blue color filter portion, providing the same light transmission for the respective color filters. This yields a display image of good contrast irrespective of the color being displayed.

Such control of the ration W/L of the thin film transistor of each color can easily be effected by selecting the size of a mask which determines the ratio W/L, during the manufacture of the liquid crystal display element.

(b) According to expression (1), the drain current $I_D$ is proportional to the gate capacitance $C_g$, which is in inverse proportion to the thickness d of the gate insulating film, and the drain current $I_D$ is also in inverse proportion to the thickness d of the gate insulating film. Accordingly, the light transmission factors of the red, green and blue color filters can be made uniform by selecting the thicknesses of the gate insulating films of their thin film transistors gradually smaller in that order.

Control of the thicknesses of the gate insulating films can be achieved by forming first a film for the thin film transistor of the blue color filter all over the surface of the underlying layer, then forming a film for the thin film transistor of the green color filter on a selected area of the film through use of a mask and forming a film for the thin film transistor of the red color filter on a selected area of the film for the thin film transistor of the green color filter through use of a mask.

(c) According to expression (1), the drain current $I_D$ is in proportion to $(V_G - V_T)^2$, and the threshold voltage $V_T$ varies with the impurity concentration of the amorphous silicon semiconductor layer. The threshold voltage $V_T$ drops when doping the amorphous silicon with an impurity of the group V. Accordingly, the light transmission factors of the three color filters can be made uniform by selecting the impurity concentrations of the amorphous silicon semiconductor layers in the thin film transistors of the red, green and blue color filters gradually higher in that order.

Figure 6:
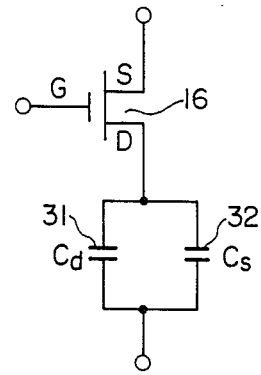
FIG. 6 is an equivalent circuit diagram of the thin film transistor of the invention.

(d) In the liquid crystal display element a capacitor 31 by the display electrode 15 is connected, as a load capacitance, to the drain of the thin film transistor 16, as shown in FIG. 6. Electric charge is stored in the capacitor 31 via the thin film transistor 16, and this electric charge yields a voltage V across the liquid crystal between the display electrode 15 and the common electrode. Where the amount of electric charge Q stored in the capacitor 31 is constant, the voltage V is in inverse proportion to the capacitance Cd of the capacitor 31.

Accordingly, in the thin film transistor of each of the red and green color filters, for example, an auxiliary capacitor 32 of a capacitance Cs is connected in parallel to the capacitor 31, as depicted in FIG. 6, so that the voltage V produced in the capacitor 31 is lower than the voltage produced in the capacitor 31 connected to the thin film transistor of the blue color filter when the same electric charge is applied to the both capacitors 31. Moreover, the capacitance Cs of the auxiliary capacitor 32 for the red color filter is selected larger than the capacitance Cs of the auxiliary capacitor 32 for the green filter. This yields the same transmittance for the respective color filters.

Figure 7:
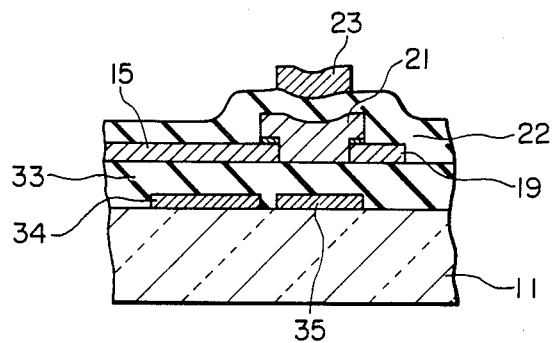
FIG. 7 is a sectional view illustrating an example of a thin film transistor provided with an auxiliary capacitor according to the invention.

The parallel connection of such an auxiliary electrode 32 to the display electrode 15 can be provided simply by forming an auxiliary electrode 34 as of ITO on the substrate 11 in opposing relation to the display electrode 15 across an insulating layer 33 as of $SiO_2$, as shown in FIG. 7. In this example a light shielding layer 35 of chromium or the like is formed on the substrate 11 in opposing relation to the semiconductor layer 21 across the insulating layer 33, thereby shielding the semiconductor layer 21 from external light.

As described above, according to the present invention, the structural factors of each thin film transistor, such as the ratio W/L, the thickness d of the gate insulating film, the load capacitance, and the impurity concentration of the semiconductor layer, are selected in accordance with the corresponding color filter, by which substantially the same light transmittance is provided for all of the red, green and blue color filters. This yields an excellent display, with no variation in contrast according to the color in which the display is produced.

Furthermore, the manufacture of the liquid crystal display element of the present invention does not involve controlling the thicknesses of the respective color filters, and hence is far easier than in the past. That is, the respective color filters can be formed to the same thickness, which allows ease in providing a uniform orientation, yielding substantially the same response time for respective color signals.

It will be apparent that many modifications and variations may be effected without departing from the scope of the novel concepts of the present invention.

What is claimed is:

1. An active color liquid crystal display element in which display electrodes are arranged in a matrix form within a liquid crystal cell, color filters of three primary colors are each disposed opposite one of the display electrodes, the color filters being distributed substantially uniformly, and a thin film transistor connected to each display electrode is controlled, by switching, in accordance with an input color image signal, whereby charging and discharging of the display electrode are selectively performed to thereby display a color image, characterized in that the structures of the thin film transistors are selected corresponding to the color filters of the three primary colors so that substantially the same light transmission-voltage characteristic is provided for all the three color filter portions.

2. The color liquid crystal display element of claim 1, wherein the configuration of the channel of each thin film transistor is selected in accordance with the color filter corresponding thereto.

3. The color liquid crystal display element of claim 2, wherein, letting the width and length of the channel be represented by W and L, respectively, a ratio W/L of the thin film transistor connected to the display electrode of the green color filter is higher than the ratio W/L of the thin film transistor connected to the display electrode of the red color filter but lower than the ratio W/L of the thin film transistor connected to the display electrode of the blue color filter.

4. The color liquid crystal display element of claim 1, wherein the thickness of a gate insulating film of each thin film transistor is selected in accordance with the color filter corresponding thereto.

5. The color liquid crystal display element of claim 4, wherein the gate insulating film of the thin film transistor connected to the display electrode of the green color filter is thinner than the gate insulating film of the thin film transistor connected to the display electrode of the red color filter but thicker than the gate insulating film of the thin film transistor connected to the display electrode of the blue color filter.

6. The color liquid crystal display element of claim 1, wherein the impurity concentration of a semiconductor layer of each thin film transistor is selected in accordance with the color filter corresponding thereto.

7. The color liquid crystal display element of claim 6, wherein the impurity concentration of the semiconductor layer of the thin film transistor connected to the display electrode of the green color filter is higher than the impurity concentration of the semiconductor layer of the thin film transistor connected to the display electrode of the red color filter but lower than the impurity concentration of the semiconductor layer of the thin film transistor connected to the display electrode of the blue color filter.

8. The color liquid crystal display element of claim 1, wherein the storage capacitance of each thin film transistor is selected in accordance with the color filter corresponding thereto.

9. The color liquid crystal display element of claim 8, wherein an auxiliary capacitor is connected in parallel to the display electrode of the green color filter to provide an increased storage capacitance for the thin film transistor corresponding thereto, and an auxiliary capacitor is connected in parallel to the display electrode of the red color filter to provide a further increased storage capacitance for the thin film transistor corresponding thereto.

10. The color liquid crystal display element of claim 9, wherein the auxiliary capacitors are each formed by an auxiliary electrode of a transparent conductive film disposed opposite each display electrode.

* * * * *